June 9, 1931.   F. G. HARRIS   1,809,694
TRACTOR DRAWN DISK PLOW
Filed Aug. 22, 1929
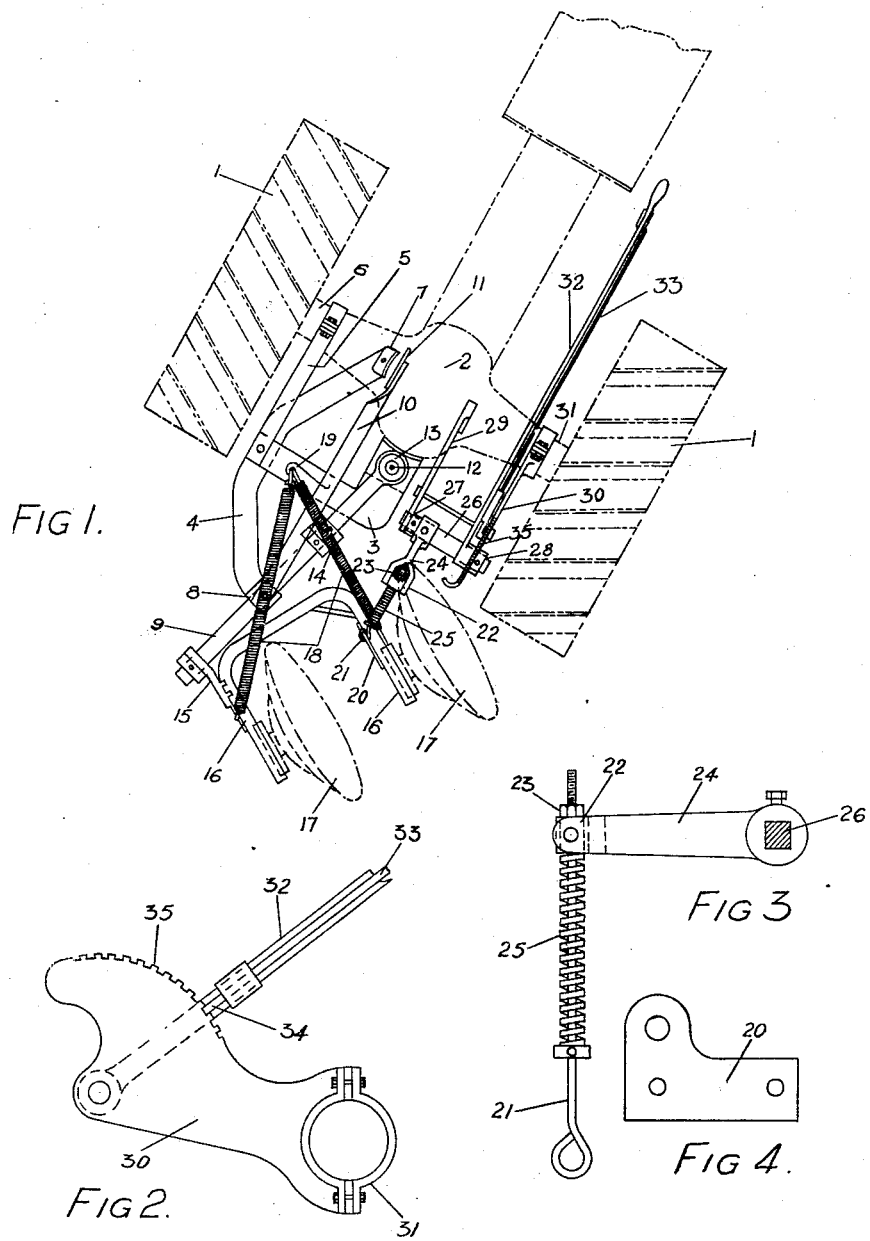

Patented June 9, 1931

1,809,694

UNITED STATES PATENT OFFICE

FREDERICK GAINFORD HARRIS, OF MOUNT BAUPLE, QUEENSLAND, AUSTRALIA

TRACTOR DRAWN DISK PLOW

Application filed August 22, 1929, Serial No. 387,720, and in Australia January 21, 1929.

This invention relates to a tractor drawn disk plow and to means for attaching same to a tractor.

The object of this invention is to provide a plow of simple, strong and efficient construction for attachment to the rear of a tractor; said plow having a framework rigidly secured adjacent to the rear wheels; the disks mounted upon the said framework having a spring controlled radial movement adapted to absorb sudden shocks when obstructions are encountered.

The invention also contemplates the provision of means for raising and lowering the said disks, and compensation for the weight of the disks, enabling the combined tractor and plow to be easily and conveniently handled by one man.

In the specification reference will be had to the attached sheet of drawings wherein like numerals in the different figures denote the same parts, and wherein—

Figure 1 is a plan of the rear portion of a tractor to which is attached the apparatus for carrying and supporting the disks.

Figure 2 is a detail side view showing the quadrant for raising and lowering the disks.

Figure 3 is a detail side view of the lever pull rod, and spring, whereby the lift is directly applied to the bar framework carrying the disks.

Figure 4 is a detail view of the bracket which is bolted to the framework and to which the lifting rod is directly connected.

The invention has been shown in the drawings applied to a well known tractor, but will be modified slightly insofar as the clips and brackets upon the differential housing or tractor framework are concerned. The main framework, lifting and supporting apparatus will however be capable of standard production for various tractors. The framework may be quickly and easily affixed to and removed from the tractor.

Referring to Figure 1 the rear portion of a tractor is shown and includes wheels 1 and differential housing 2. Connected to the differential housing 2 is a bracket 3 which carries at its other end another bracket 4, the latter being fastened near its centre.

This bracket 4 is further strengthened by a brace 5 which at one end is clipped by a clip 6 over the differential housing 2. The other end of this brace 5 is connected to the bracket 4, at a point where the bracket 3 is secured.

The bracket 4 is bolted to one side of the differential casing 2 by means of a bracket 7, the other end 8 of this bracket 4 forming a support for the bar 9.

Another brace 10 is connected to the differential housing 2 at a point 11 and to the bracket 4 at a point 8 where it supports the bar 9. This bar 9 is fastened at a point 13 by bolt 12 passing through the beforementioned bracket at the rear of the differential housing 2.

Hinged on bar 9 at points 14 and 15 is a bar framework 16 which carries the disk cutters 17.

Two springs 18 are attached to this bar framework 16 and also to the lug 19 branching off the support 10.

The bracket 20 (see Figure 4) is bolted to the bar framework 16 and through a hole in this bracket 20 an eye-bolt 21 (see Figure 3) is secured. This eye-bolt 21 passes through a jaw 22 at the end of lever 24. The eye-bolt 21 passes through a spring 25 the tension of which is adjusted by means of a nut 23. Lever 24 is connected to a square shaft 26 which hinges in bearings 27 and 28 on brackets 29 and 30. The brackets 29 and 30 are secured to the differential housing 2, in the case of bracket 30 by means of a clip 31.

Attached to shaft 26 is a hand lever 32 carrying on it a rod 33 and pawl 34 (see Figure 2) which engages notches 35 in the quadrant on bracket 30.

When plowing is to be commenced, the disks 17 are adjusted to the desired depth by the hand lever 32, which partially rotates the shaft 26 which in turn raises or lowers the lever 24 and disks 17 carried by U frame 16 which is hinged to the framework rigidly attached to the tractor. Upon an obstruction being met by the disks they rise against the spring 25 which absorbs the shock, the U frame 16 carrying the disks 17 partially rotating on the shaft 9 which is rigid. Whilst the driver is lifting the disks 17 he is assisted by the springs 18 which compensate for the weight of the disks 17.

It will be obvious that the disks 17 being as close as possible to the tractor wheels, and rigidly secured to the tractor and following it, there is not the tendency for them to interfere with the steering of the tractor; and furthermore the weight of the tractor is practically upon them allowing a deeper and better cut. It will also be understood that by means of the lever 32 the disks may be raised clear of the ground when the plow is being transported.

A plow constructed in accordance with this invention, and drawn by a tractor, will bury rubbish and perform hillside work, either throwing up or down owing to its being rigidly attached to the tractor which it must follow and by which it is controlled.

I claim

1. A plow attachment for tractors, comprising a frame adapted to be secured to the differential housing of a tractor and to extend rearwardly therefrom, a bar secured to said frame and extending rearwardly therefrom and diagonally with respect to the axis of the tractor, a plow carrier frame pivotally connected to said bar and extending laterally therefrom, brackets adapted to be secured to the differential housing on the side opposite the first named frame, and a lever having a shaft mounted in bearings, with which said brackets are provided, and also having an arm connected to said plow carrier frame, said lever serving to raise and lower the plow carrier frame.

2. An attachment as claimed in claim 1, including also a connecting spring between the first named frame and the plow carrier frame and tending to lift the latter.

3. An attachment as claimed in claim 1, in which the connection between the lever arm and the plow carrier frame is a bolt extending through and movable in the direction of its length with respect to the arm, a spring on said bolt and bearing between a stop member on the bolt and the arm and an adjusting nut on said bolt bearing on the upper side of said arm.

FREDERICK GAINFORD HARRIS.